(12) United States Patent
Knittel et al.

(10) Patent No.: US 7,740,677 B2
(45) Date of Patent: Jun. 22, 2010

(54) OIL SEPARATOR

(75) Inventors: Peter Knittel, Metzingen (DE); Klaus Bendl, Oberderdingen (DE)

(73) Assignee: ElringKlinger AG, Dettingen (DE)

( * ) Notice: Subject to any disclaimer, the term of this patent is extended or adjusted under 35 U.S.C. 154(b) by 742 days.

(21) Appl. No.: 11/605,059

(22) Filed: Nov. 28, 2006

(65) Prior Publication Data
US 2007/0151215 A1 Jul. 5, 2007

(30) Foreign Application Priority Data
Dec. 28, 2005 (DE) .................. 10 2005 063 274

(51) Int. Cl.
*B01D 45/12* (2006.01)
(52) U.S. Cl. .................... 55/346; 55/459.1; 55/DIG. 28
(58) Field of Classification Search ............ 55/447, 55/459.1, DIG. 28, 346, 349
See application file for complete search history.

(56) References Cited

U.S. PATENT DOCUMENTS

| 6,591,820 B2 | 7/2003 | Kitano et al. ............ 123/572 |
| 6,811,586 B2 * | 11/2004 | Stegmaier et al. ............ 55/337 |
| 2003/0070982 A1 | 4/2003 | Baek ................. 210/512.1 |
| 2004/0103889 A1 | 6/2004 | Akiyama et al. ............ 123/572 |

FOREIGN PATENT DOCUMENTS

| DE | 101 22 994 C2 | 11/2002 |
| DE | 102 47 041 A1 | 5/2003 |
| DE | 102 39 899 A1 | 3/2004 |
| DE | 10 2004 002 310 A1 | 8/2005 |
| DE | 10 2004 019 154 A1 | 11/2005 |
| DE | 10 2005 063 274.2 | 12/2005 |
| EP | 1 394 459 | 3/2004 |
| EP | 1 555 399 | 7/2005 |
| EP | 1 559 876 A2 | 8/2005 |
| JP | 2002-545521 A | 12/2002 |
| JP | 2003-49625 A | 2/2003 |
| JP | 2004-84506 A | 3/2004 |
| JP | 2005-133599 A | 5/2005 |

* cited by examiner

*Primary Examiner*—Robert A Hopkins

(57) ABSTRACT

In order to provide an oil separator for separating oil from a blowby gas of a cylinder head of an internal combustion engine, which oil separator is manufactured separately from a basic body of a cylinder head cover but may nevertheless be easily integrated into the cylinder head cover, it is proposed that the oil separator comprises an oil separator module, which is manufactured separately from a basic body of a cylinder head cover and comprises a cyclone plate having at least one cyclone as well as a base plate, wherein the cyclone plate is fastened to the base plate and the oil separator module is fastenable to the basic body of the cylinder head cover.

26 Claims, 15 Drawing Sheets

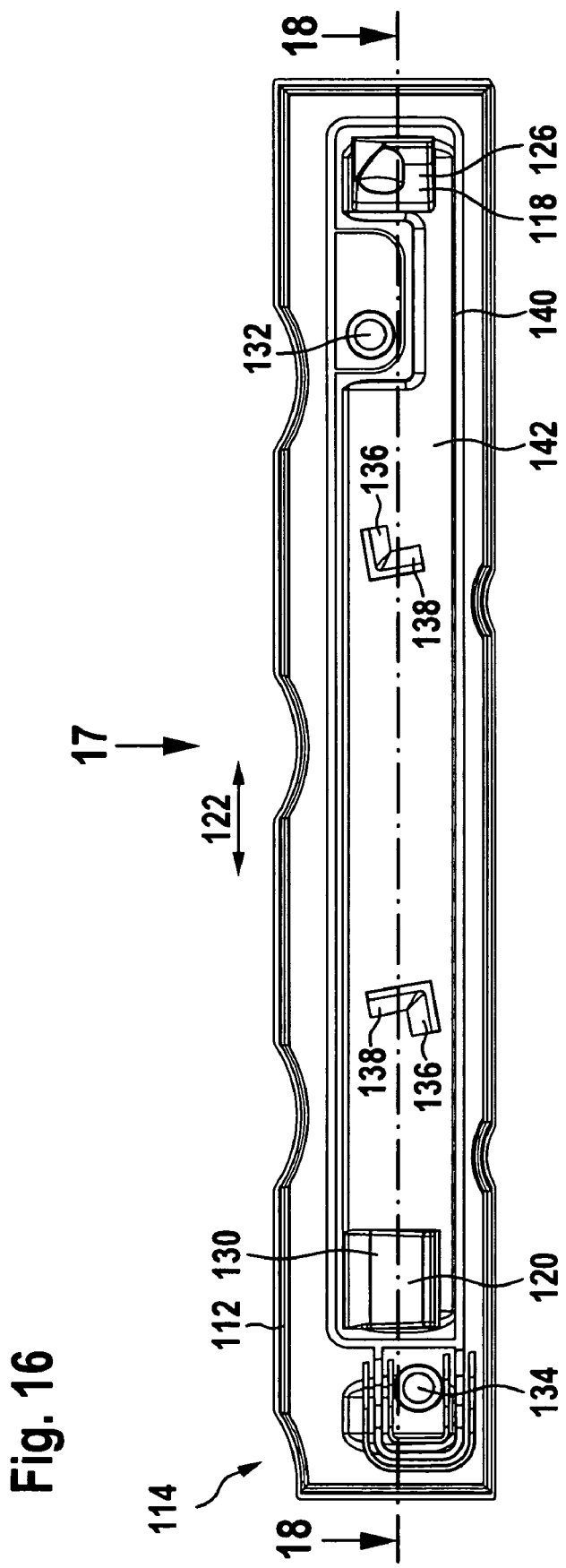

OIL SEPARATOR

RELATED APPLICATION

The present disclosure relates to the subject matter disclosed in German Patent Application No. 10 2005 063 274.2 of Dec. 28, 2005, the entire specification of which is incorporated herein by reference.

FIELD OF THE DISCLOSURE

The present invention relates to an oil separator for separating oil from a blowby gas of a cylinder head of an internal combustion engine.

BACKGROUND

Such an oil separator is known for example from EP 1 559 876 A2. This known oil separator comprises a plurality of cyclones for separating the oil from the blowby gas, wherein each cyclone comprises a bowl, which is formed integrally with a bottom shell of a cylinder head cover, and an immersion tube, which is formed integrally with a top shell of the cylinder head cover. The cyclones in this case therefore form an integral component of a twin-shelled basic body of the cylinder head cover and are manufactured together with the basic body.

SUMMARY OF THE INVENTION

The underlying object of the present invention is to provide an oil separator of the initially described type that is manufactured separately from a basic body of a cylinder head cover but may nevertheless be easily integrated into the cylinder head cover.

In an oil separator having the features of the preamble of claim 1, this object is achieved according to the invention in that the oil separator comprises an oil separator module, which is manufactured separately from a basic body of a cylinder head cover and comprises a cyclone plate having at least one cyclone and a base plate, wherein the cyclone plate is fastened to the base plate and the oil separator module is fastenable to the basic body of the cylinder head cover.

Because the oil separator module is manufactured separately from the basic body of the cylinder head cover, modifications to the oil separator module may be carried out without this affecting the manufacture of the basic body of the cylinder head cover. As a result, the oil separator module of the oil separator according to the invention may be designed in a particularly flexible manner and may be used together with cylinder head covers having different basic bodies.

In order to achieve a gastight permanent connection of the cyclone plate to the base plate of the oil separator module, it is advantageously provided that the cyclone plate is welded to the base plate.

In a preferred development of the invention, it is provided that the cyclone axis of the cyclone in the fitted state of the oil separator forms with the horizontal an angle of at most approximately +/−20°, preferably of at most +/−10°. The effect achieved by such a position of the cyclone, which differs only a little from a horizontal position, is that the overall height of the oil separator is smaller than in the case of a vertical position of the cyclone. Consequently, the overall height of the cylinder head cover, into which the oil separator module is integrated, may also be reduced.

In the case of the oil separator known from EP 1 559 876 A2, the cyclone axes of the cyclones form with the horizontal an angle of approximately 30°.

To reduce the necessary height, it is particularly advantageous when the cyclone axis of the cyclone in the fitted state of the oil separator is oriented substantially horizontally.

In principle, it may be provided that the cyclone plate comprises only one cyclone.

In a preferred development of the invention, it is however provided that the cyclone plate comprises at least two cyclones.

In order to prevent the gas streams, which pass out of the two cyclones, from obstructing one another, it is advantageous when the cyclone axes of at least two cyclones are mutually offset in a direction oriented horizontally in the fitted state of the oil separator.

When there is a plurality of cyclones on the cyclone plate, it may be provided that the at least two cyclones are swept successively by the blowby gas in order by means of a two-stage oil separation to achieve a particularly high oil separation effect.

As a rule, however, an adequate separation effect is already achieved by each volume fraction of the blowby gas flowing through only one cyclone.

In this case, it is advantageous when at least two cyclones are swept parallel to one another by the blowby gas in order to increase the flow rate of blowby gas through the oil separator.

In order, prior to sweeping of the cyclones, to achieve a pressure equalization and a reduction of the speed of the blowby gas, it is advantageous when the oil separator module comprises a settling chamber, which is delimited by the base plate and by the cyclone plate and is connected by a cyclone approach flow channel to the interior of at least one cyclone.

In a preferred development of the invention, it is provided that the oil separator comprises at least two cyclones and that the settling chamber is connected to both cyclones by in each case at least one cyclone approach flow channel. The effect achieved in such a development by providing a common settling chamber for the at least two cyclones is that the blowby gas to be cleansed of oil is always distributed as uniformly as possible to the cyclones of the oil separator module independently of the operating state and the position of the internal combustion engine.

In order to generate a flow of the blowby gas that is directed towards the cyclone approach flow channel, it is advantageous when the base plate is provided with at least one baffle element that guides blowby gas in the direction of a cyclone approach flow channel.

Such a baffle element may in particular take the form of a baffle rib projecting from the base plate.

In a preferred development of the invention, it is further provided that the oil separator comprises at least one oil outflow valve that is disposed at the outlet of an oil collecting chamber.

Such an oil outflow valve may in particular comprise an elastically deformable cap provided with an oil through-opening.

The base plate is preferably manufactured separately from the cyclone plate.

The subject matter of the invention is further a cylinder head cover that comprises at least one oil separator according to the invention.

The oil separator module of the oil separator is in said case preferably fastened to a basic body of the cylinder head cover.

In order to achieve a gastight, permanent connection of the oil separator module to the basic body of the cylinder head cover, it is preferably provided that the oil separator module is welded to a basic body of the cylinder head cover.

The available installation space is utilized particularly well when the oil separator module is disposed in the interior of the cylinder head cover.

A further underlying object of the present invention is to indicate a method of manufacturing a cylinder head cover with an integrated oil separator whereby despite separate manufacture of an oil separator module, on the one hand, and of a basic body of the cylinder head cover, on the other hand, easy and efficient integration of the oil separator into the cylinder head cover is possible.

This object is achieved by a method that comprises the following method steps:

fastening a cyclone plate having at least one cyclone to a base plate to form an oil separator module;

fastening the oil separator module to a basic body of the cylinder head cover.

In this case, the base plate is preferably manufactured separately from the cyclone plate and then connected to the cyclone plate.

The oil separator according to the invention comprises an oil separator module, in which a cyclone plate and a base plate (oil baffle) are combined into a unit that is easy to handle and simple to fasten to a basic body of the cylinder head cover.

The use of at least one cyclone in the oil separator according to the invention also allows large quantities of very finely distributed oil to be separated reliably from the blowby gas.

The cyclones of the oil separator module are fastened via a support of the base plate (oil baffle) to the basic body of the cylinder head cover, in particular by welding.

When cyclones are used in a horizontal position, the oil separator module of the oil separator according to the invention has a very low installation height of for example ca. 35 mm to ca. 40 mm, thereby saving a considerable amount of space compared to oil separator systems with vertically oriented cyclones.

Further features and advantages of the invention are the subject matter of the following description and graphic representation of an embodiment.

BRIEF DESCRIPTION OF THE DRAWINGS

FIG. 15: a diagrammatic longitudinal section through the immersion tube element of FIG. 14 along the line 15-15 in FIG. 14;

FIG. 16: a diagrammatic plan view of a base plate of the oil separator module of FIG. 7;

Identical or functionally equivalent elements are denoted by the same reference characters in all of the drawings.

DETAILED DESCRIPTION OF THE INVENTION

Figure 1:
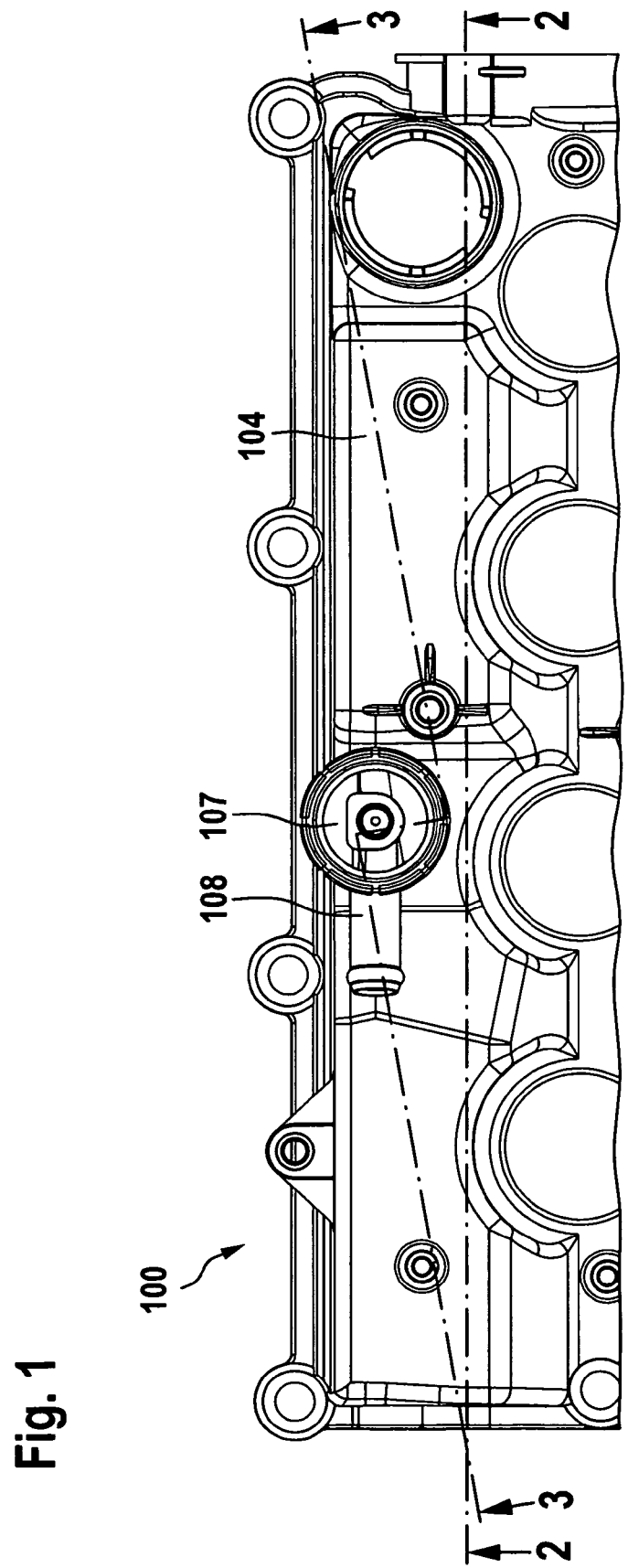
FIG. 1: a diagrammatic plan view of a portion of a cylinder head cover with an integrated oil separator module.
Figure 2:
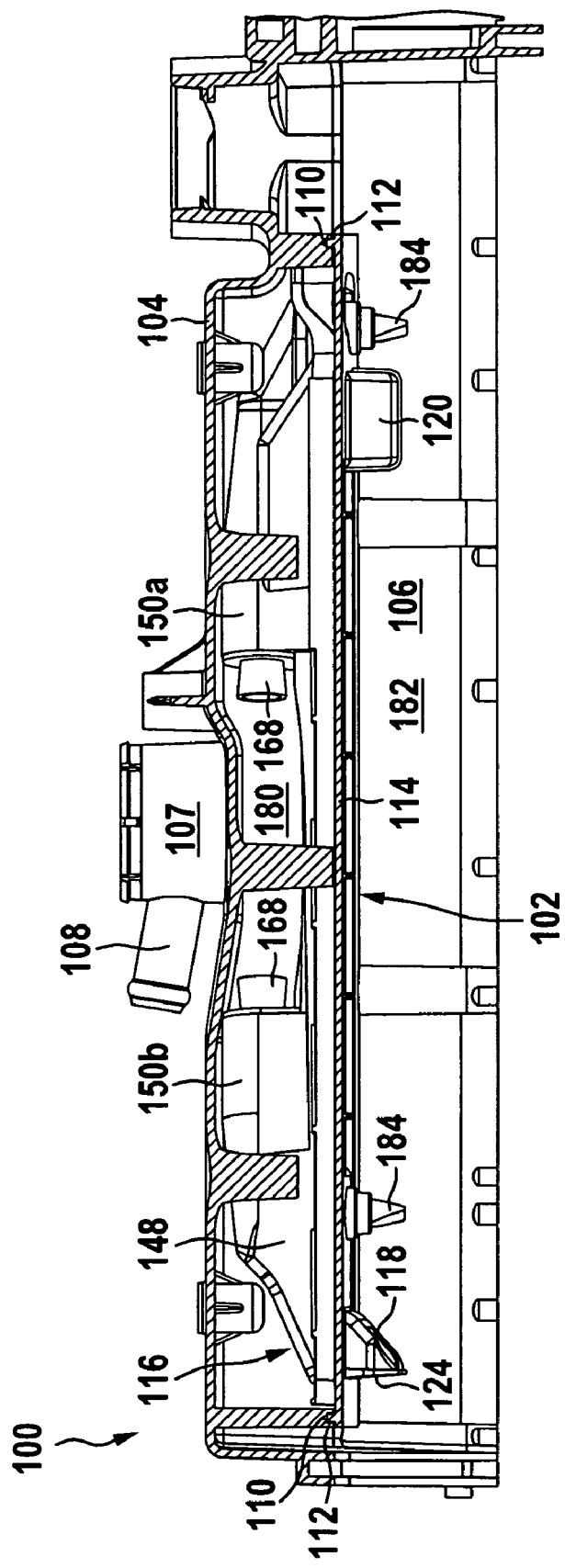
FIG. 2: a diagrammatic longitudinal section through the cylinder head cover with the integrated oil separator module of FIG. 1 along the line 2-2 in FIG. 1.

A cylinder head cover denoted as a whole by 100 and having an integrated oil separator 102 is represented in FIGS. 1 to 5 and comprises a basic body 104, which surrounds an interior 106, and a pressure control valve 107, which is disposed on the outside of the basic body 104 and has an interior-side inlet and an outlet 108.

The basic body 104 is manufactured for example as an injection moulded part from a plastics material having the required chemical and heat resistance.

Figure 3:
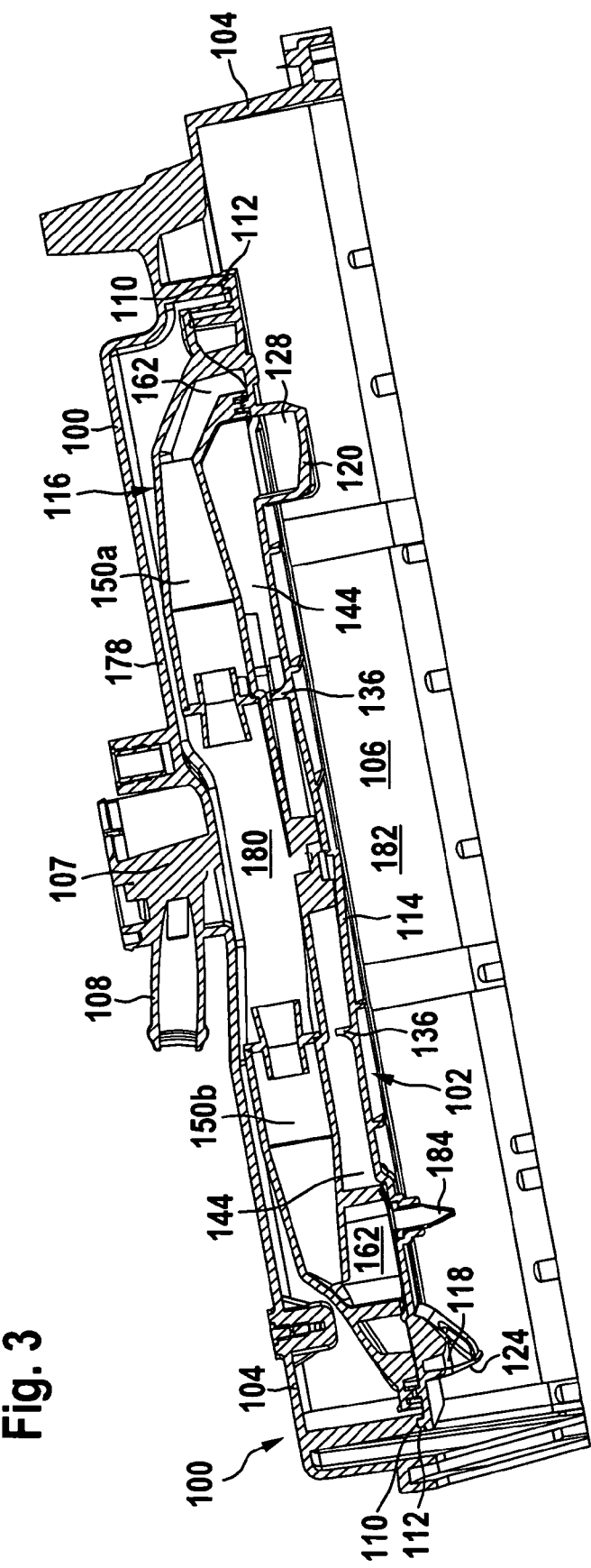
FIG. 3: a diagrammatic section though the cylinder head cover with the integrated oil separator module of FIG. 1 along the line 3-3 in FIG. 1.
Figure 4:
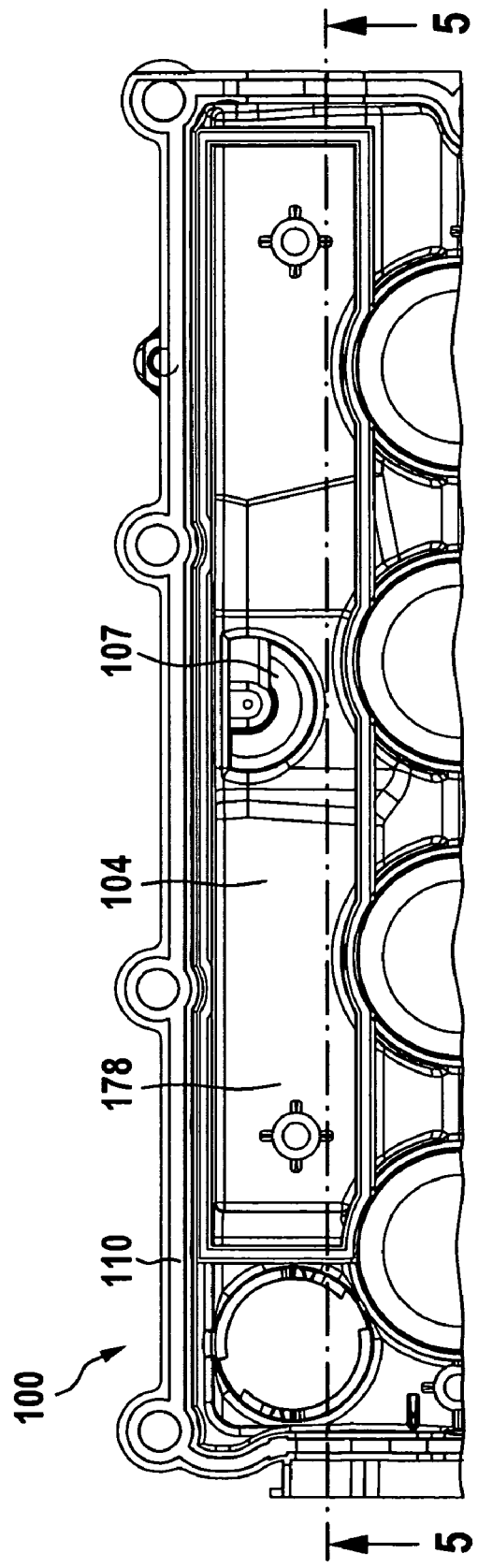
FIG. 4: a diagrammatic inverted plan view of a portion of a basic body of the cylinder head cover of FIG. 1, without the oil separator module.
Figure 5:
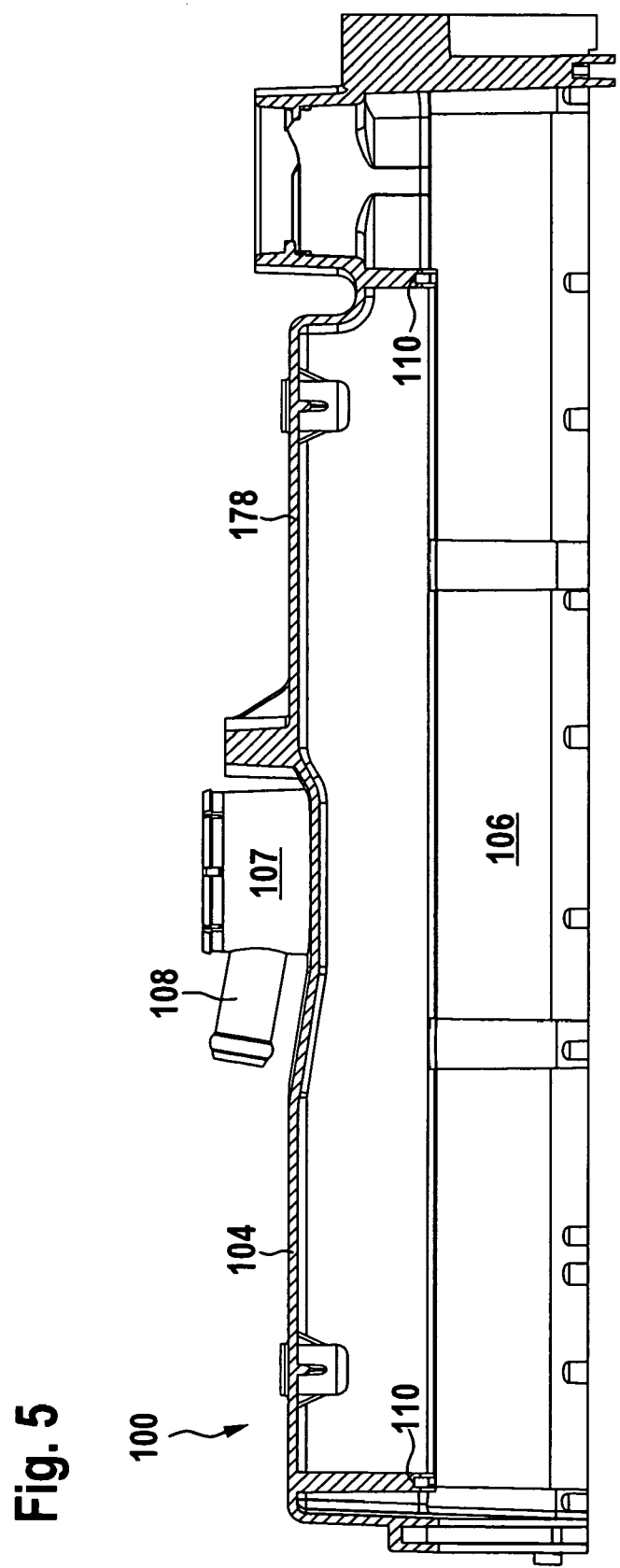
FIG. 5: a diagrammatic longitudinal section through the basic body of the cylinder head cover of FIG. 4 along the line 5-5 in FIG. 4.
Figure 6:
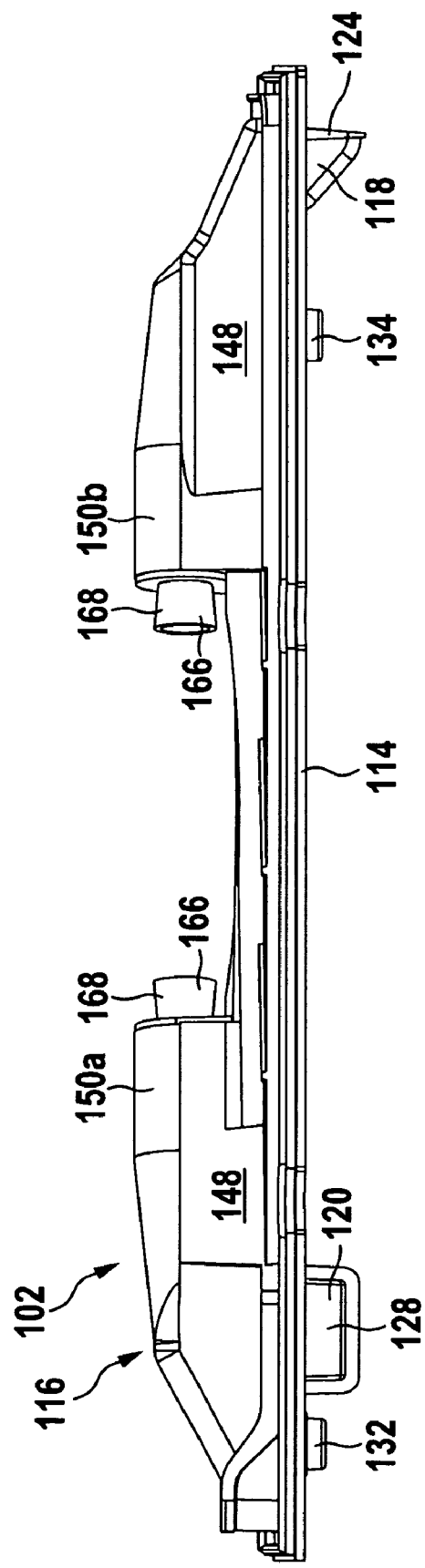
FIG. 6: a diagrammatic side view of the oil separator module.

Formed on the inside of the basic body 104 is a substantially rectangular welding edge 110 (see FIG. 4), along which the basic body 104 is welded to a complementary welding edge 112 of a base plate 114 of an oil separator module denoted as a whole by 116 (see FIGS. 3 and 4).

Figure 17:
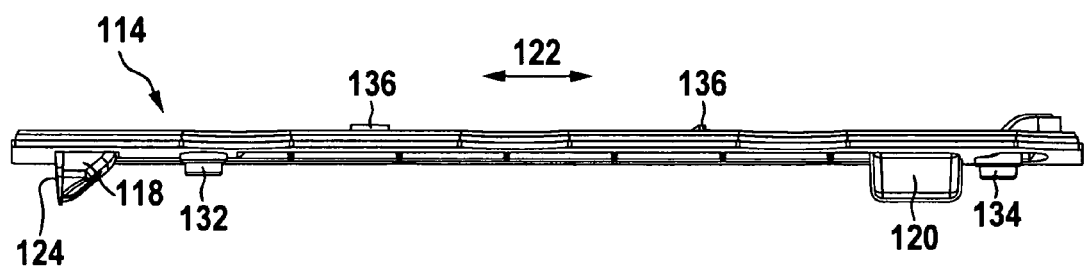
FIG. 17: a diagrammatic side view of the base plate of FIG. 16, viewed in the direction of the arrow 17 in FIG. 16.
Figure 18:
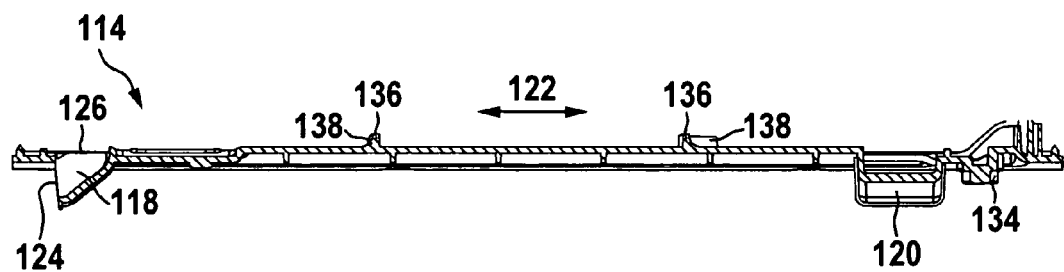
FIG. 18: a diagrammatical longitudinal section through the base plate of FIG. 16 along the line 18-18 in FIG. 16.

As is evident from FIGS. 16 to 18, the base plate 114 is of a substantially rectangular design and comprises at a left end a first inflow channel 118 and at a right end a second inflow channel 120.

The first inflow channel 118 leads from an inflow opening 124, which is oriented substantially vertically and at right angles to a longitudinal direction 122 of the base plate 114, at an underside of the base plate 114 to a substantially horizontally oriented outflow opening 126 at the upper side of the base plate 114.

The second inflow channel 120 leads from an inflow opening 128, which is oriented substantially vertically and parallel to the longitudinal direction 122 of the base plate 114, at the underside of the base plate 114 to a substantially horizontally oriented outflow opening 113 at the upper side of the base plate 114.

The base plate 114 further comprises a first oil outlet opening 132, which is adjacent to the first inflow channel 118, and a second oil outlet opening 134, which is adjacent to the second inflow channel 120.

The base plate 114 is moreover provided with two angular baffle ribs 136 projecting upwards from its upper side, which serve as baffle elements 138 to guide blowby gas, which flows in through the inflow channels 118, 120, in each case in the direction of an approach flow opening of a cyclone approach flow channel 165, which will be described in greater detail below.

The portion of the upper side of the base plate 114 that has the outflow openings 126, 130 and the baffle ribs 136 is surrounded by an upwardly projecting, annularly closed welding edge 140 and forms a base 142 of a settling chamber 144 of the oil separator module 116.

The base plate 114 is of an integral construction and is manufactured for example as an injection moulded part from a plastics material having the necessary chemical and thermal resistance.

Along the welding edge 140 the base plate 114 is welded to a cyclone plate 148, which is separately represented in FIGS. 10 to 13.

Figure 7:
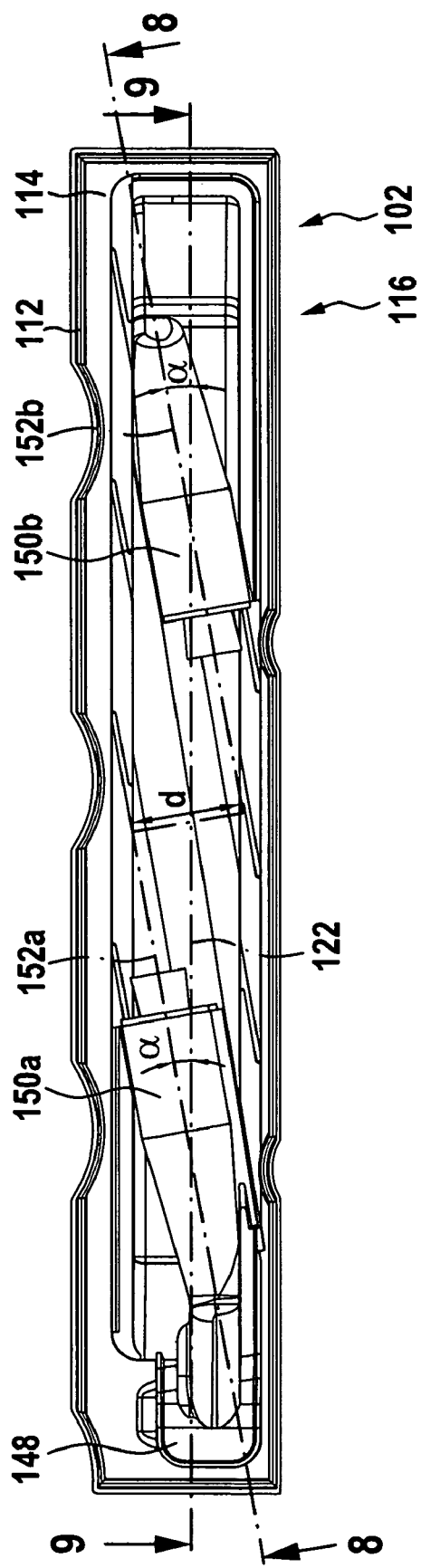
FIG. 7: a diagrammatic plan view of the oil separator module of FIG. 6.

The cyclone plate 148 comprises two cyclones 150a, 150b, which in the fitted state of the oil separator 102 have substantially horizontally oriented cyclone axes (longitudinal centre lines) 152a and 152b respectively. The cyclone axes 152a, 152b extend substantially parallel to the upper side of the base plate 114 and substantially parallel to one another but are offset at right angles to one another in a horizontal direction by an amount d that corresponds approximately to the outside diameter of a cyclone 150a, 150b (see in particular FIG. 7).

Furthermore, the cyclone axes 152a, 152b form with the longitudinal direction 122 of the base plate 114 an acute angle α of for example approximately 10°.

This rotation relative to the longitudinal direction of the base plate 114 and the lateral offset d prevent the air streams, which exit from the mutually opposing outlet openings of the two cyclones 150a, 150b, from colliding directly with one another, which would lead to adverse flow conditions through the oil separator 102.

Figure 8:
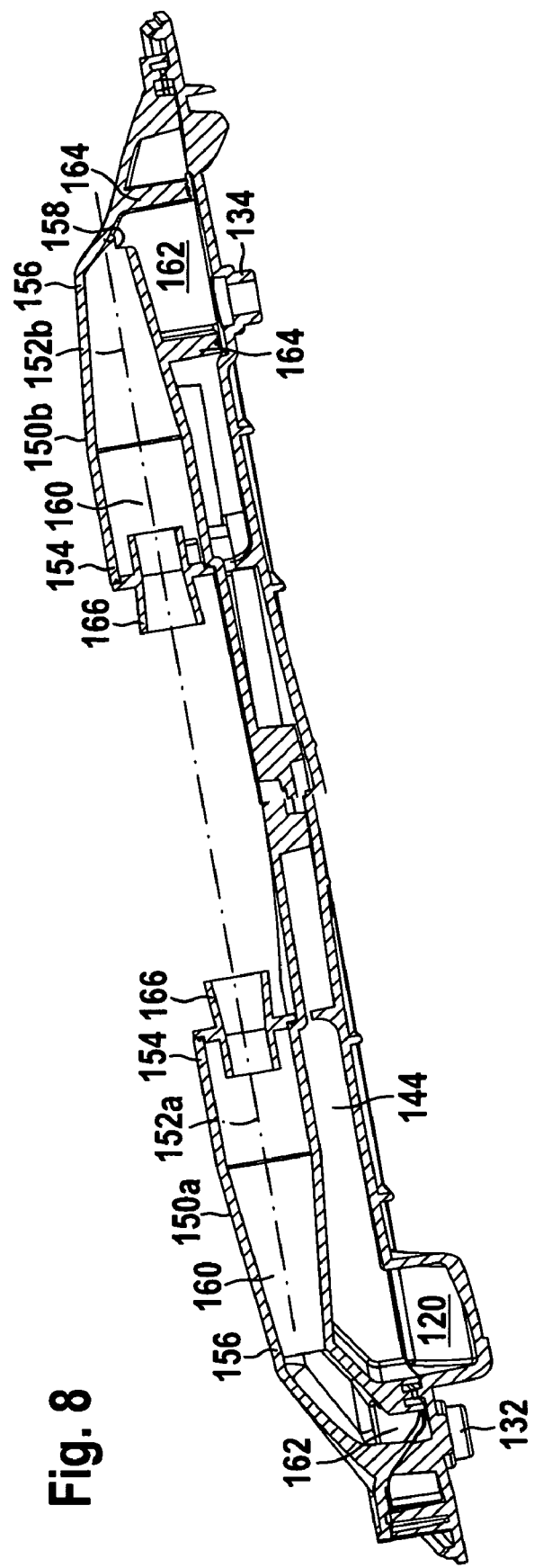
FIG. 8: a diagrammatic section through the oil separator module of FIG. 7 along the line 8-8 in FIG. 7.
Figure 9:
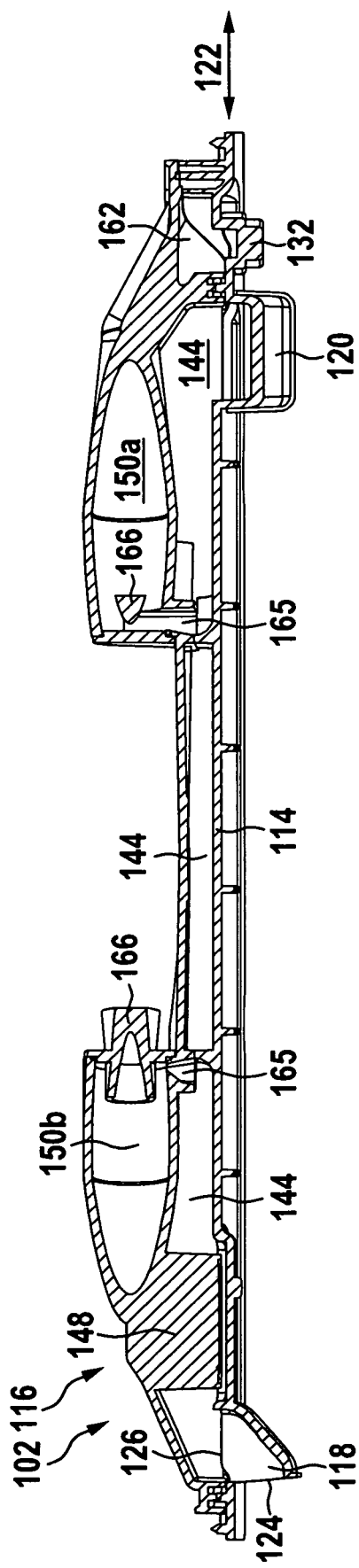
FIG. 9: a diagrammatic longitudinal section through the oil separator module of FIG. 7 along the line 9-9 in FIG. 7.
Figure 10:
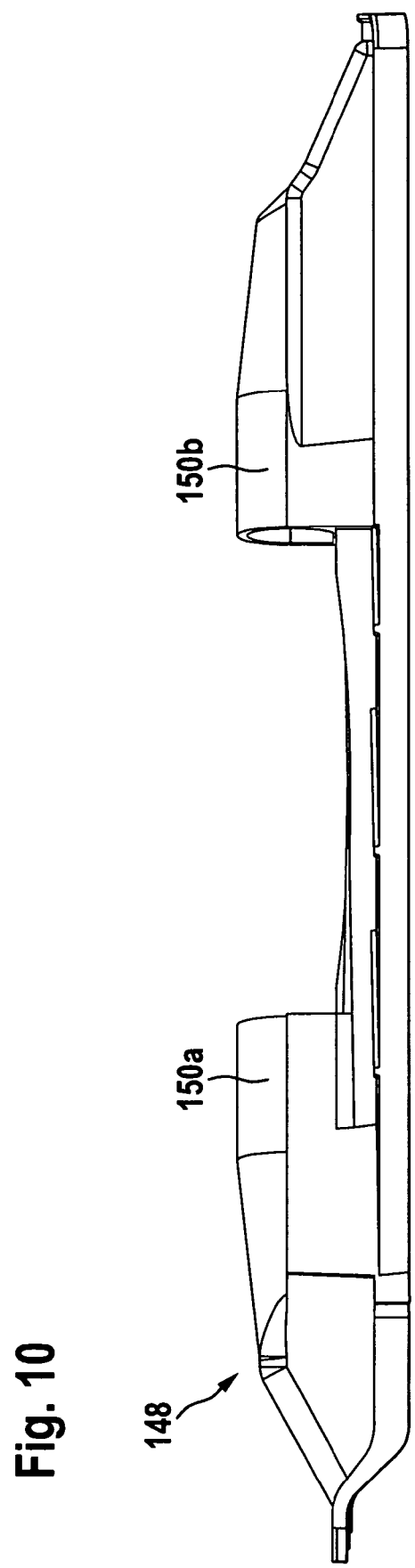
FIG. 10: a diagrammatic side view of a cyclone plate of the oil separator module of FIG. 6.
Figure 11:
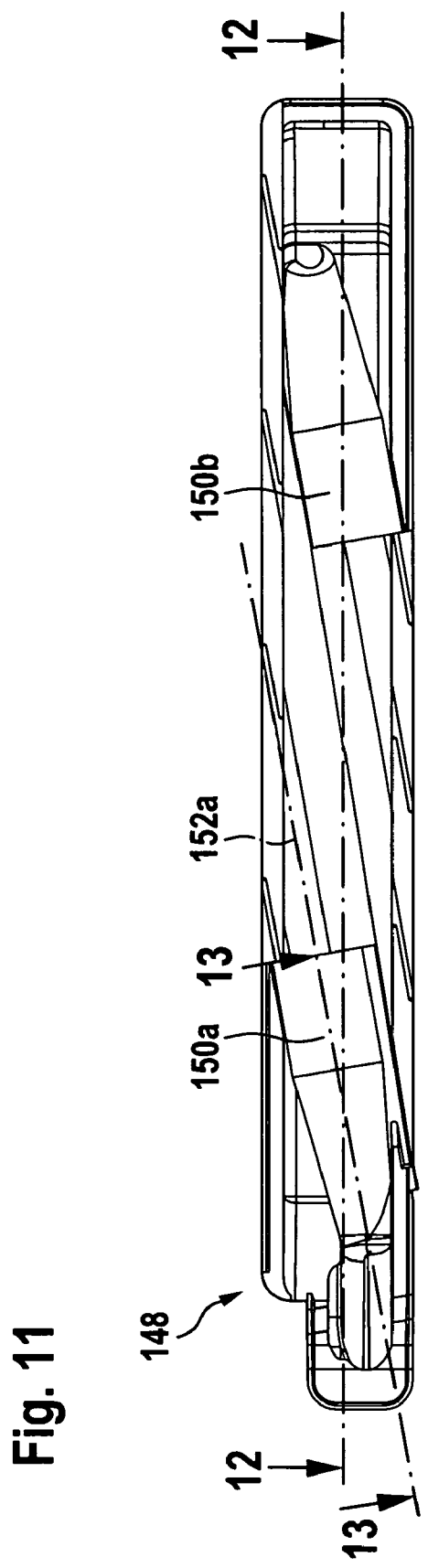
FIG. 11: a diagrammatic plan view of the cyclone plate of FIG. 10.
Figure 12:
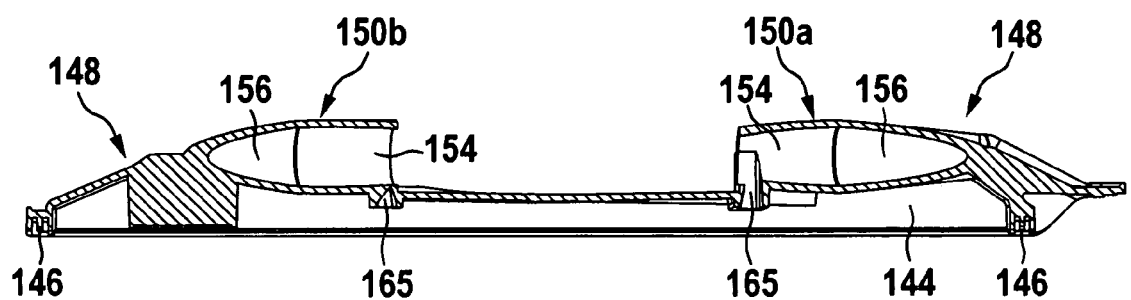
FIG. 12: a diagrammatic longitudinal section through the cyclone plate of FIG. 11 along the line 12-12 in FIG. 11.
Figure 13:
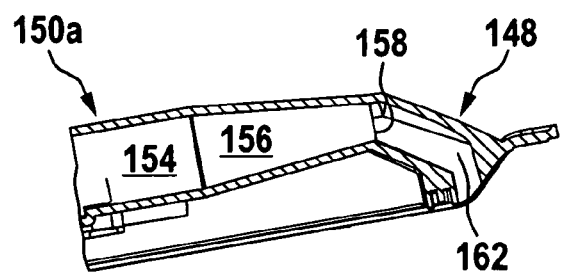
FIG. 13: a diagrammatic longitudinal section through a cyclone of the cyclone plate of FIG. 11 along the line 13-13 in FIG. 11.

As is evident for example from FIG. 8, each of the horizontally disposed cyclones 150a, 150b comprises in each case a substantially hollow-cylindrical front portion 154 adjoined along the cyclone axis 152a, 152b by a tapering rear portion 156.

Opening into the front portion 154 of the cyclone 150a, 150b there is in each case a cyclone approach flow channel 165, which extends tangentially to the inner wall of the cyclone 150a, 150b and leads from an approach flow opening lying opposite a baffle rib 136 of the base plate 114 into the interior 160 of the cyclone 150a, 150b.

The rear end of the rear portion 156 remote from the front portion 154 is closed, apart from an oil through-opening 158.

By means of this oil through-opening 158 the interior 160 of each cyclone 150a, 150b is connected to an oil collecting chamber 162, which is disposed under the rear portion 156 of the cyclone 150a, 150b and formed by a closed chamber that is delimited in an upward direction by the rear portion 156 of the relevant cyclone 150a, 150b, laterally by substantially vertical side walls 164 formed integrally with the cyclone plate 148, and in a downward direction by a portion of the base plate 114 that contains a respective one of the oil outlet openings 132 and 134.

The cyclone plate 148 and the base plate 114 moreover jointly surround the settling chamber 144, into which the blowby gas flows through the inflow channels 118, 120 and out of which the blowby gas flows through the cyclone approach flow channels 165 and which is otherwise closed in a gastight manner.

Figure 14:
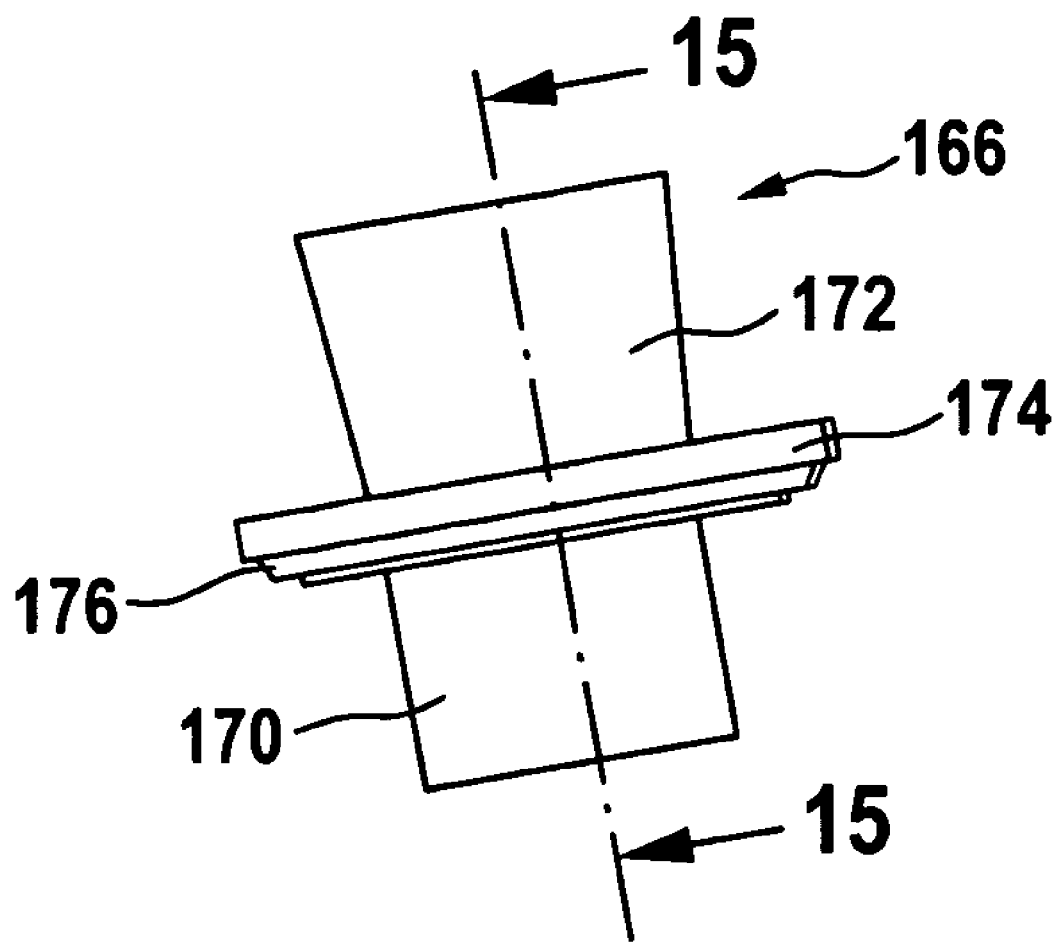
FIG. 14: a diagrammatic side view of an immersion tube element of a cyclone of the oil separator module.

At its front end remote from the rear portion 156, the front portion 154 of each cyclone 150a, 150b is closed by means of an immersion tube element 166, one of which is represented separately in FIGS. 14 and 15.

Each immersion tube element 166 comprises an immersion tube 168 having a substantially hollow-cylindrical rear portion 170 and a flared front portion 172 emanating from the rear portion 170 as well as an annular collar 174, which in the region of the transition from the rear portion 170 to the front portion 172 of the immersion tube 168 projects radially outwards from the immersion tube 168.

The annular collar 174 is welded at its outer edge along a welding edge 176 to the end face of the front portion 154 of the respective associated cyclone 150a, 150b (see for example FIG. 8).

Each of the immersion tube elements 166 is designed integrally and for example in the form of an injection moulded part from a plastics material having the necessary chemical and thermal resistance.

The cyclone plate 148 is also designed integrally and for example in the form of an injection moulded part from a suitable plastics material having the necessary chemical and thermal resistance.

As may best be seen from FIG. 3, the oil separator module 116 formed by base plate 114, cyclone plate 148 and immersion tube elements 166 is disposed in such a way on the inside of the basic body 104 of the cylinder head cover 100 that the oil separator module 116 and a portion 178 of the basic body 104 jointly surround a clean gas chamber 180, which is separated in a gastight manner from the remaining interior 106 of the cylinder head cover 100 and into which the immersion tubes 168 of the cyclones 150a, 150b and the inlet of the pressure control valve 107 open.

The remaining interior of the cylinder head cover 100 forms a crank chamber 182.

The crank chamber 182 is connected to the oil separator module 116 by the inflow channels 118, 120, through which oil-containing blowby gas may be sucked out of the crank chamber 182, as well as by two oil discharge valves 184, which are inserted each into one of the oil outlet openings 132 and 134 in the base plate 114 and through which oil separated from the blowby gas by means of the cyclones 150a, 150b is returned to the crank chamber 182.

Each of the oil discharge valves 184 may comprise for example an elastically deformable cap having a narrow, slot-shaped oil through-opening.

The procedure for manufacturing the previously described cylinder head cover 100 with integrated oil separator 102 is as follows:

The cylinder head cover 100, the base plate 114, the cyclone plate 148 and the immersion tube elements 166 are manufactured separately from one another as injection moulded parts from a suitable plastics material.

The cyclone plate 148 is placed onto the base plate 114 and welded along the welding edges 146, 140 to the base plate 114.

This welding operation may be effected in particular by means of a friction welding technique.

The immersion tube elements 166 are inserted into the respective associated cyclone 150a, 150b of the cyclone plate 148 and welded along the welding edge 176 to the respective cyclone 150a, 150b.

This welding operation may be effected for example by means of an ultrasonic welding technique.

The welding of the immersion tube elements 166 to the cyclone plate 148 may alternatively be effected before the cyclone plate 148 is welded to the base plate 114.

Finally, the oil separator module 116 formed by base plate 114, cyclone plate 148 and immersion tube elements 166 is inserted into the cylinder head cover 100 and welded along the welding edges 110, 112 to the basic body 104 of the cylinder head cover 100.

This welding operation may be effected for example by means of an ultrasonic welding technique.

Compared to friction welding, ultrasonic welding offers the advantage that the weld seam takes up less space.

On the other hand, compared to ultrasonic welding, the friction welding technique offers the advantage that, with it, three-dimensional weld seams, i.e. weld seams that do not extend exclusively within one plane, may be produced.

The oil separator 102 integrated in the previously described manner into the cylinder head cover 100 operates as follows:

During operation of the oil separator 102 the outlet 108 of the pressure control valve 107 is connected by a suction line (not shown) to an air intake arrangement of the internal combustion engine, on which the cylinder head cover 100 is disposed.

Between this suction line and the crank chamber 182 there occurs a pressure difference that causes a gas flow of oil-containing blowby gas from the crank chamber 182 through the oil separator module 116 into the clean gas chamber 180 and from there through the pressure control valve 107 into the suction line.

The oil-containing blowby gas passes first through the inflow channels 118, 120 of the base plate 114 into the settling chamber 144, which is surrounded by the base plate 114 on the one hand and by the cyclone plate 148 on the other hand and separated in a gastight manner from the clean gas chamber 180.

In the settling chamber 144 a pressure equalization and a reduction of the speed of the blowby gas occurs.

By means of the baffle ribs 136 disposed in the settling chamber 144, the blowby gas is directed into the cyclone approach flow channels 165 of the two cyclones 150a, 150b, through which the blowby gas passes substantially tangentially into the front portion 154 of the respective cyclone 150a, 150b.

In the interior 160 of each of the cyclones 150a, 150b a turbulent flow of the blowby gas is therefore generated, as a result of which the oil particles entrained by the blowby gas are deposited on the inner wall of the respective cyclone 150a, 150b and pass in the cyclone 150a and/or 150b rearwards to the oil through-opening 158 and through it into the respective oil collecting chamber 162, whereas the blowby gas cleansed of the oil passes through the immersion tubes 168 of the cyclones 150a, 150b into the clean gas chamber 180 and from there through the pressure control valve 107 into the suction line.

The cyclones 150a, 150b also allow large oil quantities in the form of very fine oil particles (for example with a diameter of less than a micrometer) to be separated from the blowby gas.

The oil collected in the oil collecting chambers 162 of the oil separator module 116 passes through oil discharge valves 184 at the oil outlet openings 132 and 134 back into the crank chamber 182 or, through oil removal lines connected to the oil discharge valves 184, into the oil sump of the internal combustion engine.

The invention claimed is:

1. Oil separator for separating oil from a blowby gas of a cylinder head of an internal combustion engine,
   wherein the oil separator comprises an oil separator module, which is manufactured separately from a basic body of a cylinder head cover and comprises a cyclone plate having at least one cyclone and a base plate, wherein the cyclone plate is fastened to the base plate and the oil separator module is fastenable to the basic body of the cylinder head cover; and
   wherein the cyclone axis of the cyclone in the fitted state of the oil separator forms with the horizontal an angle of at most approximately +/−20°.

2. Oil separator according to claim 1, wherein the cyclone plate is welded to the base plate.

3. Oil separator according to claim 1, wherein the cyclone axis of the cyclone in the fitted state of the oil separator forms with the horizontal an angle of at most approximately +/−10°.

4. Oil separator according to claim 3, wherein the cyclone axis of the cyclone in the fitted state of the oil separator is oriented substantially horizontally.

5. Oil separator according to claim 1, wherein the cyclone plate comprises at least two cyclones.

6. Oil separator according to claim 1, wherein the cyclone axes of at least two cyclones are mutually offset in a direction oriented horizontally in the fitted state of the oil separator.

7. Oil separator according to claim 5, wherein at least two cyclones are swept parallel to one another by the blowby gas.

8. Oil separator according to claim 1, wherein the oil separator module comprises a settling chamber, which is delimited by the base plate and by the cyclone plate and is connected by a cyclone approach flow channel to the interior of at least one cyclone.

9. Oil separator according to claim 8, wherein the oil separator comprises at least two cyclones and wherein the settling chamber is connected to both cyclones by in each case at least one cyclone approach flow channel.

10. Oil separator according to claim 1, wherein the base plate is provided with at least one baffle element, which guides blowby gas in the direction of a cyclone approach flow channel.

11. Oil separator according to claim 1, wherein the oil separator comprises at least one oil discharge valve, which is disposed at the outlet of an oil collecting chamber.

12. Oil separator according to claim 11, wherein the oil discharge valve comprises an elastically deformable cap provided with an oil through-opening.

13. Oil separator according to claim 1, wherein the base plate is manufactured separately from the cyclone plate.

14. Cylinder head cover, comprising at least one oil separator according to claim 1.

15. Cylinder head cover according to claim 14, wherein the oil separator module is fastened to a basic body of the cylinder head cover.

16. Cylinder head cover according to claim 15, wherein the oil separator module is welded to a basic body of the cylinder head cover.

17. Cylinder head cover according to claim 14, wherein the oil separator module is disposed in the interior of the cylinder head cover.

18. Cylinder head cover according to claim 5, wherein two cyclones have mutually opposing outlet openings.

19. Cylinder head cover according to claim 5, wherein the cyclone axes of the cyclones form with a longitudinal direction of the base plate an acute angle.

20. Method of manufacturing a cylinder head cover with an integrated oil separator, comprising the following method steps:
   fastening a cyclone plate having at least one cyclone to a base plate to form an oil separator module;
   fastening the oil separator module to a basic body of the cylinder head cover;
   wherein the cyclone axis of the cyclone in the fitted state of the oil separator forms with the horizontal an angle of at most approximately +/−20°.

21. Method according to claim 20, wherein the base plate is manufactured separately from the cyclone plate.

22. Oil separator for separating oil from a blowby gas of a cylinder head of an internal combustion engine,
   wherein the oil separator comprises an oil separator module, which is manufactured separately from a basic body of a cylinder head cover and comprises a cyclone plate having at least one cyclone and a base plate, wherein the cyclone plate is fastened to the base plate and the oil separator module is fastenable to the basic body of the cylinder head cover; and wherein the cyclone plate comprises at least two cyclones.

23. Oil separator for separating oil from a blowby gas of a cylinder head of an internal combustion engine,
   wherein the oil separator comprises an oil separator module, which is manufactured separately from a basic body of a cylinder head cover and comprises a cyclone plate having at least one cyclone and a base plate, wherein the cyclone plate is fastened to the base plate and the oil separator module is fastenable to the basic body of the cylinder head cover; and
   wherein the cyclone axes of at least two cyclones are mutually offset in a direction oriented horizontally in the fitted state of the oil separator.

24. Oil separator for separating oil from a blowby gas of a cylinder head of an internal combustion engine,
   wherein the oil separator comprises an oil separator module, which is manufactured separately from a basic body of a cylinder head cover and comprises a cyclone plate having at least one cyclone and a base plate, wherein the cyclone plate is fastened to the base plate and the oil separator module is fastenable to the basic body of the cylinder head cover; and
   wherein the oil separator module comprises a settling chamber, which is delimited by the base plate and by the cyclone plate and is connected by a cyclone approach flow channel to the interior of at least one cyclone, wherein the oil separator comprises at least two cyclones and wherein the settling chamber is connected to both cyclones by in each case at least one cyclone approach flow channel.

25. Oil separator for separating oil from a blowby gas of a cylinder head of an internal combustion engine,
   wherein the oil separator comprises an oil separator module, which is manufactured separately from a basic body of a cylinder head cover and comprises a cyclone plate having at least one cyclone and a base plate, wherein the cyclone plate is fastened to the base plate and the oil separator module is fastenable to the basic body of the cylinder head cover; and
   wherein the base plate is provided with at least one baffle element, which guides blowby gas in the direction of a cyclone approach flow channel.

26. Cylinder head cover, comprising at least one oil separator for separating oil from a blowby gas of a cylinder head of an internal combustion engine,
   wherein the oil separator comprises an oil separator module, which is manufactured separately from a basic body of the cylinder head cover and comprises a cyclone plate having at least one cyclone and a base plate, wherein the cyclone plate is fastened to the base plate and the oil separator module is fastenable to the basic body of the cylinder head cover; and
   wherein the oil separator module is disposed in the interior of the cylinder head cover.

* * * * *